US012348417B2

(12) United States Patent
Voit et al.

(10) Patent No.: US 12,348,417 B2
(45) Date of Patent: Jul. 1, 2025

(54) STATELESS NETWORK ADDRESS PRIVACY (SNAP)

(71) Applicant: Cisco Technology, Inc., San Jose, CA (US)

(72) Inventors: Eric A. Voit, Bethesda, MD (US); David Maluf, Mountain View, CA (US); Matthew S MacPherson, Apex, NC (US); Sri Gundavelli, San Jose, CA (US); Ali Sajassi, Alamo, CA (US)

(73) Assignee: Cisco Technology, Inc.

( * ) Notice: Subject to any disclaimer, the term of this patent is extended or adjusted under 35 U.S.C. 154(b) by 273 days.

(21) Appl. No.: 18/051,974

(22) Filed: Nov. 2, 2022

(65) Prior Publication Data
US 2024/0146766 A1 May 2, 2024

(51) Int. Cl.
*H04L 45/7453* (2022.01)
*G06F 21/62* (2013.01)
*H04L 9/40* (2022.01)
*H04L 65/75* (2022.01)

(52) U.S. Cl.
CPC ...... *H04L 45/7453* (2013.01); *G06F 21/6263* (2013.01); *H04L 63/164* (2013.01); *H04L 65/75* (2022.05)

(58) Field of Classification Search
CPC ... H04L 45/7453; H04L 45/741; H04L 65/75; H04L 9/0631; G06F 21/14; G06F 9/544; G06F 21/60; G06F 21/54; G06F 8/423; G06F 12/1408; G06F 21/6263
See application file for complete search history.

(56) References Cited

U.S. PATENT DOCUMENTS

| | | | |
|---|---|---|---|
| 9,641,434 B1* | 5/2017 | Laurence | H04L 45/7453 |
| 2009/0144829 A1* | 6/2009 | Grigsby | G06F 21/6263 |
| | | | 726/26 |
| 2013/0294348 A1 | 11/2013 | Haddad | |
| 2018/0048564 A1 | 2/2018 | Bianco et al. | |
| 2019/0188157 A1* | 6/2019 | Shamsaasef | H04L 65/75 |

FOREIGN PATENT DOCUMENTS

CN 1142688604 A 4/2022

OTHER PUBLICATIONS

Wasserman, M. et al. "IPv6-TO-IPv6 Network Prefix Translation" Cisco Systems, Feb. 28, 2011; (21 pages).
Wasserman, M. et al. "IPv6-TO-IPV6 Network Address Translation (NAT66)" Cisco Systems, Oct. 18, 2010; (21 pages).
Juniper, "Stateless Source Network Prefix Translation for IPV6" Juniper.net; Mar. 3, 2022; (22 pages).

* cited by examiner

*Primary Examiner* — Kyung H Shin
(74) *Attorney, Agent, or Firm* — Merchant & Gould P.C.

(57) ABSTRACT

Stateless network address privacy may be provided. A data packing may be received with an obfuscated destination address and an un-obfuscated source address. An un-obfuscated destination address may be determined based on the obfuscated destination address. An obfuscated source address may be determined based on the un-obfuscated source address. The obfuscated destination address may be replaced with the un-obfuscated destination address and the un-obfuscated source address may be replaced with the obfuscated source address. The packet may be forwarded.

20 Claims, 4 Drawing Sheets

| Cypher Value | Currently Active? | Cypher Algorithm Plus Hash |
|---|---|---|
| 0000 | Never | Reserved for unNatted hosts |
| 0001 | Yes | Spec cypher, and seed |
| 0010-1011 | Yes | ARX (add-rotate-XOR) cypher |
| 1100-1110 | Inactive | Empty, will shift into use periodically |
| 1111 | Yes | ARX (add-rotate-XOR) cypher |

STATELESS NETWORK ADDRESS PRIVACY (SNAP)

TECHNICAL FIELD

The present disclosure relates generally to stateless network address privacy.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of Dynamic Host Configuration Protocol (DHCP) response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
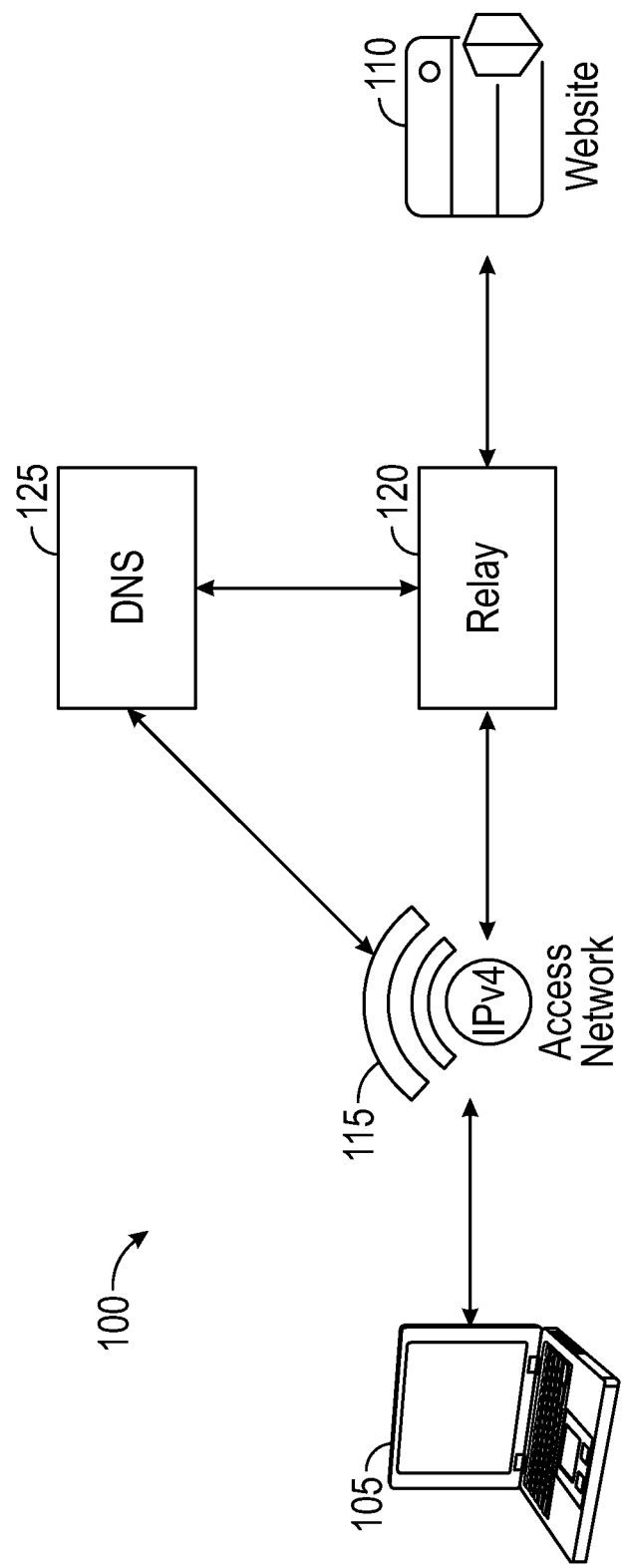
FIG. 1 is a block diagram of an operating environment for providing stateless network address privacy.

Stateless network address privacy may be provided. A data packing may be received with an obfuscated destination address and an un-obfuscated source address. An un-obfuscated destination address may be determined based on the obfuscated destination address. An obfuscated source address may be determined based on the un-obfuscated source address. The obfuscated destination address may be replaced with the un-obfuscated destination address and the un-obfuscated source address may be replaced with the obfuscated source address. The packet may be forwarded.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Privacy may be important with networks and devices on networks. For example, some devices may rotate (i.e., randomize) Media Access Control (MAC) addresses on access networks so that identity may not be easily tracked (i.e., identity obfuscation). This randomization may devalue network identity. Devaluing network identity may also devalue the benefit of equipment provided by a particular manufacturer. Accordingly, it may be valuable for a manufacturer to provide an identity obfuscation process for Internet Protocol (IP) addresses so that data center providers may not glean information about the networks or devices simply by the topology of the exposed IP addresses. In other words, it may be valuable to have an inexpensive way to allow network providers to avoid leaking identity and topology information should they consider this information valuable or profitable.

Furthermore, privacy may be a major concern in networks. There may be shifts in market value when end user behavior is obfuscated. Where the network meta data (e.g., Layers 3 and 4) may be visible, it may render endpoints visible or identifiable. This data visibility may mean analytics may be possible because there may be assets and traffic to assess. This may lead to competitive analysis, attacks, etc. In some localities, Internet Protocol (IP) addresses may be restricted from user-identification purposes (General Data Protection Regulation (GDPR), Personal Information Protection Law (PIPL), Act on the Protection of Personal Information (APPI), Personal Information Protection and Electronic Documents Act (PIPEDA)). Nevertheless there may be growth in the technologies in this space.

Embodiments of the disclosure may provide network transport privacy beyond a client server applications by hiding, for example, key identifiable information in the network, the servers, and even the devices themselves. Furthermore, embodiments of the disclosure may hide network data locality from transport providers in such a way that no single entity may track the source and destination of a communication.

FIG. 1 shows an operating environment 100. As shown in FIG. 1, operating environment 100 may comprise a first device 105, a second device 110, an access network 115, a relay 120, and a Domain Name Server (DNS) 125. First device 105 may comprise, but is not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device. Second device 110 may comprise, but it not limited to, host computing device that may host, for example, a website in the cloud.

DNS 125 may comprise a server used in the domain name system. The domain name system may comprise a hierarchical and decentralized naming system used to identify computers reachable through the Internet or other IP networks. Resource records contained in DNS 125 may associate domain names with other forms of information. These may be used to map human-friendly domain names to the numerical IP addresses computers may need to locate services and devices using the underlying network protocols. Consistent with embodiments of the disclosure, rather than return an actual destination address of a device, DNS 125 may return an obfuscated version of this address. For example, if first device 105 queries DNS 125 for the address of second device 110, DNS 125 may return an obfuscated version of second device 110's address as discussed in greater detail below.

Access network 115 may comprise a user network that may connect subscribers (e.g., first device 105) to a particular service provider and, through the carrier network, to other networks such as the Internet. For example, access network 115 may provide first device 105 access to second device 110, relay 120, and DNS 125, which may be on the Internet for example. Relay 120, in coordination with DNS 125, may provide address obfuscation as described in greater detail below.

The elements described above of operating environment 100 (e.g., first device 105, second device 110, relay 120, and DNS 125) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
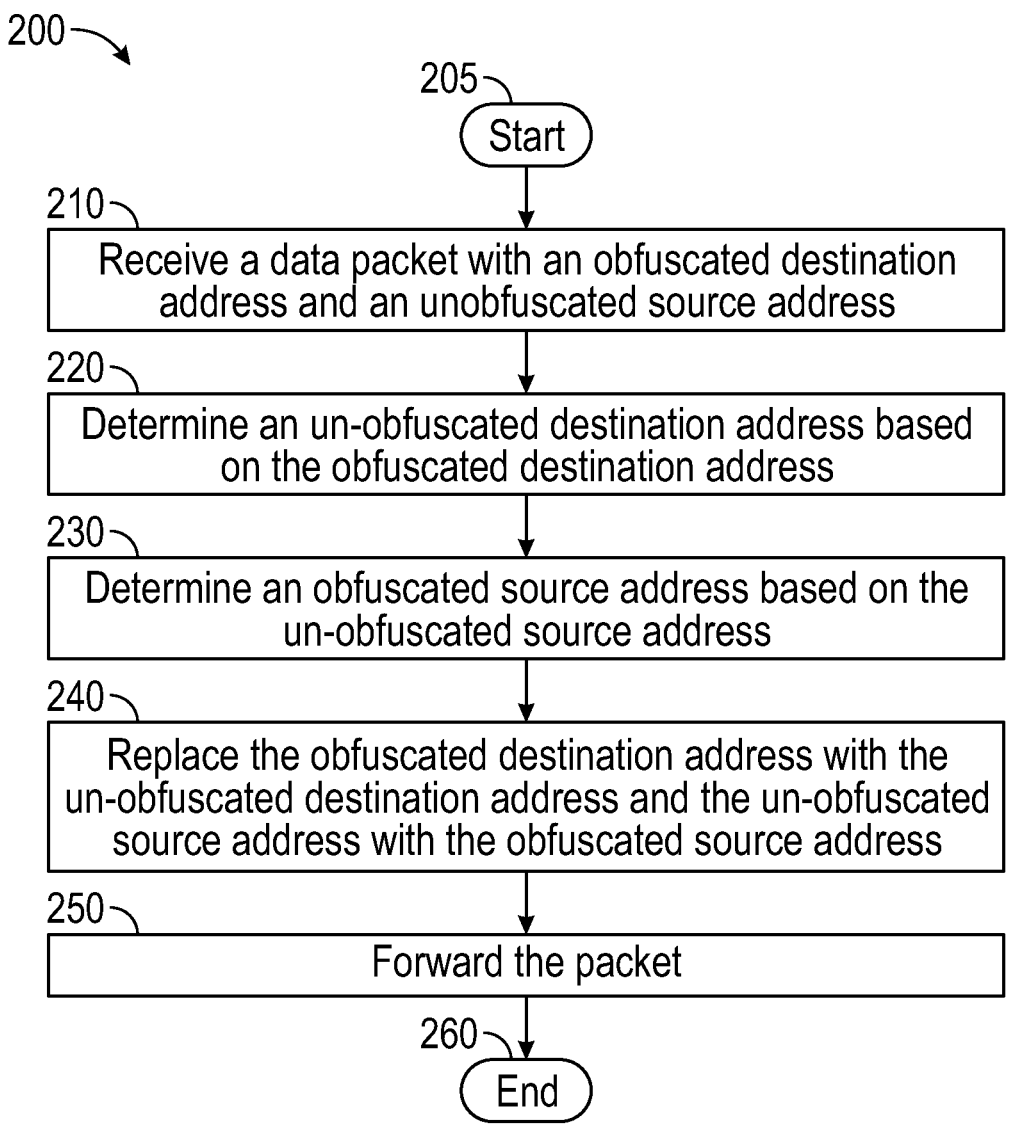
FIG. 2 is a flow chart of a method for providing stateless network address privacy.

FIG. 2 is a flow chart setting forth the general stages involved in a method 200 consistent with embodiments of the disclosure for providing stateless network address privacy. Method 200 may be implemented using relay 120 that may be embodied by a computing device 500 as described in more detail below with respect to FIG. 5. Ways to implement the stages of method 200 will be described in greater detail below.

Method 200 may begin at starting block 205 and proceed to stage 210 where relay 120 may receive a data packet with an obfuscated destination address and an un-obfuscated source address. For example, a user of first device 105 may wish to engage with a website running on second device 110. In order to do so, first device 105 may query DNS 125 for the address of second device 110. DNS 125 may return an obfuscated version of second device 110's address.

First device 105 may use the received obfuscated version of second device 110's address as the destination address for the packet to be sent to second device 110. First device 105 may use its own un-obfuscated address as the source address for the packet. First device 105 may send the packet to access network 115 that may forward the packet to relay 120. Accordingly, relay 120 may receive the data packet with the obfuscated destination address and the un-obfuscated source address.

From stage 210, where relay 120 receives the data packet with the obfuscated destination address and the un-obfuscated source address, method 200 may advance to stage 220 where relay 120 may determine an un-obfuscated destination address based on the obfuscated destination address. For example, determining the un-obfuscated destination address is described in greater detail below with respect to FIG. 3 and FIG. 4.

Once relay 120 determines the un-obfuscated destination address based on the obfuscated destination address in stage 220, method 200 may continue to stage 230 where relay 120 may determine an obfuscated source address based on the un-obfuscated source address. For example, determining the obfuscated source address is described in greater detail below with respect to FIG. 3 and FIG. 4.

After relay 120 determines the obfuscated source address based on the un-obfuscated source address in stage 230, method 200 may proceed to stage 240 where relay 120 may replace the obfuscated destination address with the un-obfuscated destination address and the un-obfuscated source address with the obfuscated source address. For example, using the above example, the packet has the actual destination address associated with second device 110. However, the actual address of first device 105 is obfuscated.

Once relay 120 replaces the obfuscated destination address with the un-obfuscated destination address and the un-obfuscated source address with the obfuscated source address in stage 240, method 200 may continue to stage 250 where relay 120 may forward the packet. For example, relay 120 may forward the packet to second device 110. Because the destination address is un-obfuscated, the packet may forward to second device 110. However, because the source address is obfuscated, second device 110 may not know the identity of first device 105. Once relay 120 forwards the packet in stage 250, method 200 may then end at stage 260.

Furthermore, relay 120 may receive a return packet from second device 110 in response to the packet. The return packet may have a destination address comprising the obfuscated source address. Relay 120 may determine an un-obfuscated destination address for the return packet based on the destination address comprising the obfuscated source address. Relay 120 may then forward the return packet to the un-obfuscated destination address for the return packet. Accordingly, first device 105 may receive the return packet.

Accordingly, relay 120 may provide stateless address privacy. When subsequent response packets (i.e., return packets) are returned back to an original device (e.g., first device 105) from a website (e.g., second device 110) to the obfuscated address, relay 120 may be able to reconstruct the original address fully and completely from information contained within the subsequently returning packet. Consequently, the process may be stateless in that it may identity a cipher contained within a full new packet which is returning. No context/state about the original communications may need to be stored and re-applied on relay 120. In other words, embodiments of the disclosure may decode returning packets without needing to retain information about the original packets. Neither side (e.g., first device 105 or second device 110) may need to know the network location of each other based solely on a single packet's addressing. Accordingly, embodiments of the disclosure may provide private or semi-private communications. Private may comprise both source and destination are obfuscated. Semi-Private may comprise one direction or the other direction is private. Each direction may have its own cipher or other mechanism associated to decoding it.

The above process may comprise an example of how the actual address of second device 110 may be obfuscated from first device 105 when first device 105 is sending the packet and how the actual address of first device 105 may be obfuscated from second device 110 when second device 110 receives the packet. Consistent with embodiments of the disclosure, the process of method 200 may be performed in reverse where second device 110 may become the source and first device 105 may become the destination. For example, when responding to the received packet, second device 110 may prepare a response packet having a source address as the un-obfuscated actual address of second device 110, but having a destination address being the obfuscated address of first device 105 taken from the received packet. Relay 120 may receive the response packet, un-obfuscate the destination address of the response packet and obfuscate the source address of the response packet. The response packet may be forwarded to first device 105. Because the source address of the response packet may be obfuscated, first device 105 may not know the identity of second device 110 from which the response packet came. In this was the obfuscation process consistent with embodiments of the disclosure may work in both directions.

Figure 3:
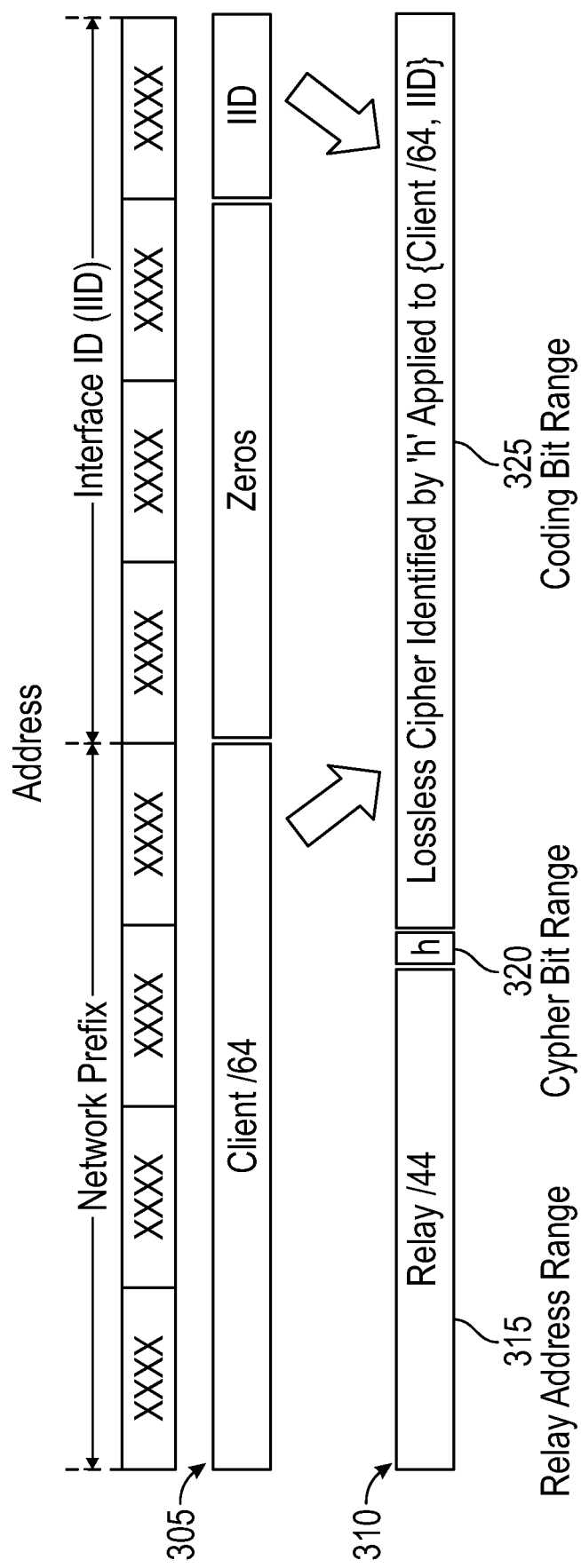
FIG. 3 illustrates address obfuscation.

FIG. 3 illustrates address obfuscation for the address of first device 105 or the address of second device 110. The process may be the same for both source and destination addresses. FIG. 3 shows an un-obfuscated address 305 and an obfuscated address 310. As shown in FIG. 3, un-obfuscated address 305 may comprise a network prefix and an Interface Identifier (IID). The network prefix may describe a network location and the interface ID may provide a unique identifying number. For example, FIG. 3 illustrates the format of a 128-bit IPv6 address that may be used for the address. Each "X" shown in the address of FIG. 3 may comprise 4 bits. Embodiments of the disclosure may use other address formats and are not limited to a 128-bit IPv6 address.

When obfuscating un-obfuscated address 305, a cypher value (e.g., "h") may be assigned to cypher bit range 320. The cypher value may be associated with a first cypher algorithm of a plurality of cypher algorithms as illustrated below with respect to FIG. 4. Embodiments of the disclosure may randomly select an active value for the cypher value from a cypher algorithm table 400 described below. This cypher value (e.g., a four bit value) may uniquely identify a current secret cypher algorithm plus a hash (i.e., seed, nonce) from a rotating set of algorithms that may be known by and coordinated between relay 120 and DNS 125. In other words, the cypher value (e.g., a 4 bit secret from a cypher algorithm table 400 described below) may be assigned. This 4 four bit secret may be used to apply a block cipher (e.g., a cypher algorithm) to transform and obfuscate the address.

To obfuscate un-obfuscated address 305, the network prefix and interface ID may be encoded by applying the first cypher algorithm (e.g., plus a hash) to provide coding bit range 325 in obfuscated address 310. The address of relay 120 may be added to the relay address range 315. In this way, a response packet may be routed to relay 120 to be to receive the obfuscation/un-obfuscation process. Addresses may be allocated in just the least significant range instead of the full 64 bits of range available for the IID. Because of the room left (e.g., "zeros"), there may be room to transform and obfuscate the address as shown in FIG. 3.

To un-obfuscate obfuscated address 310, the cypher value from cypher bit range 320 may be determined. Then a first cypher decoding algorithm associated with the first cypher value may be used to decode coding bit range 325 in obfuscated address 310 to provide un-obfuscated address 305.

Figures 4, 5:
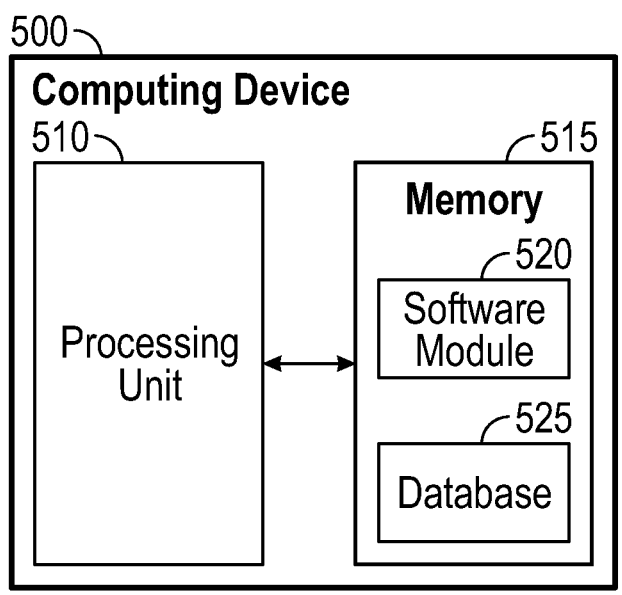
FIG. 4 illustrates a cypher table.
FIG. 5 is a block diagram of a computing device.

FIG. 4 illustrates a cypher algorithm table 400. As shown in FIG. 4, cypher algorithm table 400 may comprise a cypher value column, a column indicating if the cypher value is currently active, and a description of the algorithm and hash. As stated above, at least one cypher value may comprise a predetermined reserved value (e.g., "0000"). There may be only a certain number of cypher value active at one time allowing others to be transitioned to new algorithms periodically. Consistent with embodiments of the disclosure, before periodically changing a code for a particular cypher value, embodiments of the disclosure may stop allocating new flows to that cypher value. For example, an average Transmission Control Protocol (TCP) flow may comprise 53 seconds, this may allow the majority of flows to run to completion. Furthermore, the destination cipher may also use the destination IP address (or subnet) to determine which cypher algorithm to apply. This may mean that it may not be possible to use another website to determine instantaneously what algorithm is being applied.

The cypher value in the IPv6 address that may need to be reserved to encode the secret, as well as an IPv6 address space size that enables lossless transcoding may be important aspect of the disclosure. The cypher value may be included in each packet. This secret (e.g., the cypher value) may comprise a time based token in a part of an address to determine which return transform to use for lossless 1:1 address transcoding (i.e., obfuscate and un-obfuscate). While the aforementioned example uses IPv6, embodiments of the disclosure may use IPv4, for example, by tunneling IPv6 in IPv4.

New algorithms and hashes (e.g., seeds) may be provided dynamically like a nonce just within a domain. Specific algorithms and seeds may be anything computationally simple enough to enable quick hardware based translation. There may be many algorithms that may be used. They may comprise, for example, Add Rotate XOR (ARX) cyphers or more complex algorithms.

The aforementioned obfuscation process may be applied by request of an operator of first device 105 or second device 110. Furthermore, the aforementioned obfuscation process may be applied based upon the location (e.g., country) of first device 105 or second device 110.

Furthermore, confidential computing may be used on first device 105 (e.g., the client device). The operator of the client device where the application is running may be unable to see what is actually running within the client application on a Trusted Execution Environment running within a confidential computing chip for example. In addition, confidential computing may be used on second device 110 (e.g., the server). The client may verify over a Mutually Authenticated Secure Channel (e.g., Diffie Hellman) that the server may be running known good software in a Trusted Execution Environment for example.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing stateless network address privacy as described above with respect to FIG. 2. Computing device 500, for example, may provide an operating environment for first device 105, second device 110, relay 120, and DNS 125. First device 105, second device 110, relay 120, and DNS 125 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
 receiving, from a computing device, a data packet with an un-obfuscated source address;
 determining an obfuscated source address based on the un-obfuscated source address;
 replacing the un-obfuscated source address with the obfuscated source address;
 forwarding the packet;
 receiving a return packet in response to the packet, the return packet having a destination address comprising the obfuscated source address; and
 determining an un-obfuscated destination address for the return packet based on the destination address comprising the obfuscated source address wherein determining the un-obfuscated destination address based on the destination address comprises:
  determining a cypher value from a cypher bit range in the destination address, wherein the cypher value is associated with a first cypher of a plurality of cyphers; and
  applying a first cypher decoding algorithm associated with the first cypher value to decode a coding bit range in the destination address to provide the un-obfuscated destination address.

2. The method of claim 1, further comprising forwarding the return packet to the un-obfuscated destination address for the return packet.

3. The method of claim 1, wherein the destination address comprises a 128-bit IPv6 address comprising the coding bit range, the cypher bit range, and an address of the computing device.

4. The method of claim 1, wherein determining the obfuscated source address based on the un-obfuscated source address comprises:
   determining a cypher value of a plurality of cyphers; and
   applying a first cypher encoding algorithm associated with the cypher value to encode the un-obfuscated source address to provide the obfuscated source address.

5. The method of claim 4, further comprising randomly determining the cypher value from the plurality of cyphers.

6. The method of claim 4, further comprising periodically changing cyphers within the plurality of cyphers.

7. The method of claim 1, wherein the un-obfuscated destination address comprises a 128-bit IPv6 address and wherein the obfuscated source address comprises a 128-bit IPv6 address.

8. A system comprising:
   a memory storage; and
   a processing unit coupled to the memory storage, wherein the processing unit is operative to:
      receive a data packet with an obfuscated destination address and an un-obfuscated source address;
      determine an un-obfuscated destination address based on the obfuscated destination address;
      determine an obfuscated source address based on the un-obfuscated source address;
      replace the obfuscated destination address with the un-obfuscated destination address and the un-obfuscated source address with the obfuscated source address; and
      forward the packet.

9. The system of claim 8, wherein the processing unit being operative to determine the un-obfuscated destination address based on the obfuscated destination address comprises the processing unit being operative to:
   determine a cypher value from a cypher bit range in the obfuscated destination address, wherein the cypher value is associated with a first cypher of a plurality of cyphers; and
   apply a first cypher decoding algorithm associated with the first cypher value to decode a coding bit range in the obfuscated destination address to provide the un-obfuscated destination address.

10. The system of claim 8, wherein the processing unit being operative to determine the obfuscated source address based on the un-obfuscated source address comprises the processing unit being operative to:
   determine a cypher value of a plurality of cyphers; and
   apply a first cypher encoding algorithm associated with the cypher value to encode the un-obfuscated source address to provide the obfuscated source address.

11. The system of claim 10, further comprising the processing unit being operative to randomly determine the cypher value from the plurality of cyphers.

12. The system of claim 10, further comprising the processing unit being operative to periodically change cyphers within the plurality of cyphers.

13. The system of claim 8, wherein the un-obfuscated destination address and the obfuscated source address comprise 128-bit IPv6 addresses.

14. A non-transitory computer-readable medium that stores a set of instructions which when executed perform a method executed by the set of instructions comprising:
   receiving, from a computing device, a data packet with an obfuscated destination address and an un-obfuscated source address;
   determining an un-obfuscated destination address based on the obfuscated destination address;
   determining an obfuscated source address based on the un-obfuscated source address;
   replacing the obfuscated destination address with the un-obfuscated destination address and the un-obfuscated source address with the obfuscated source address; and
   forwarding the packet.

15. The computer-readable medium of claim 14, wherein determining the un-obfuscated destination address based on the obfuscated destination address comprises:
   determining a cypher value from a cypher bit range in the obfuscated destination address, wherein the cypher value is associated with a first cypher of a plurality of cyphers; and
   applying a first cypher decoding algorithm associated with the first cypher value to decode a coding bit range in the obfuscated destination address to provide the un-obfuscated destination address.

16. The computer-readable medium of claim 14, wherein determining the obfuscated source address based on the un-obfuscated source address comprises:
   determining a cypher value of a plurality of cyphers; and
   applying a first cypher encoding algorithm associated with the cypher value to encode the un-obfuscated source address to provide the obfuscated source address.

17. The computer-readable medium of claim 16, further comprising randomly determining the cypher value from the plurality of cyphers.

18. The computer-readable medium of claim 16 further comprising periodically changing cyphers within the plurality of cyphers.

19. The computer-readable medium of claim 14, wherein the un-obfuscated destination address comprises a 128-bit IPv6 address.

20. The computer-readable medium of claim 14, wherein the obfuscated source address comprises a 128-bit IPv6 address.

* * * * *